UNITED STATES PATENT OFFICE.

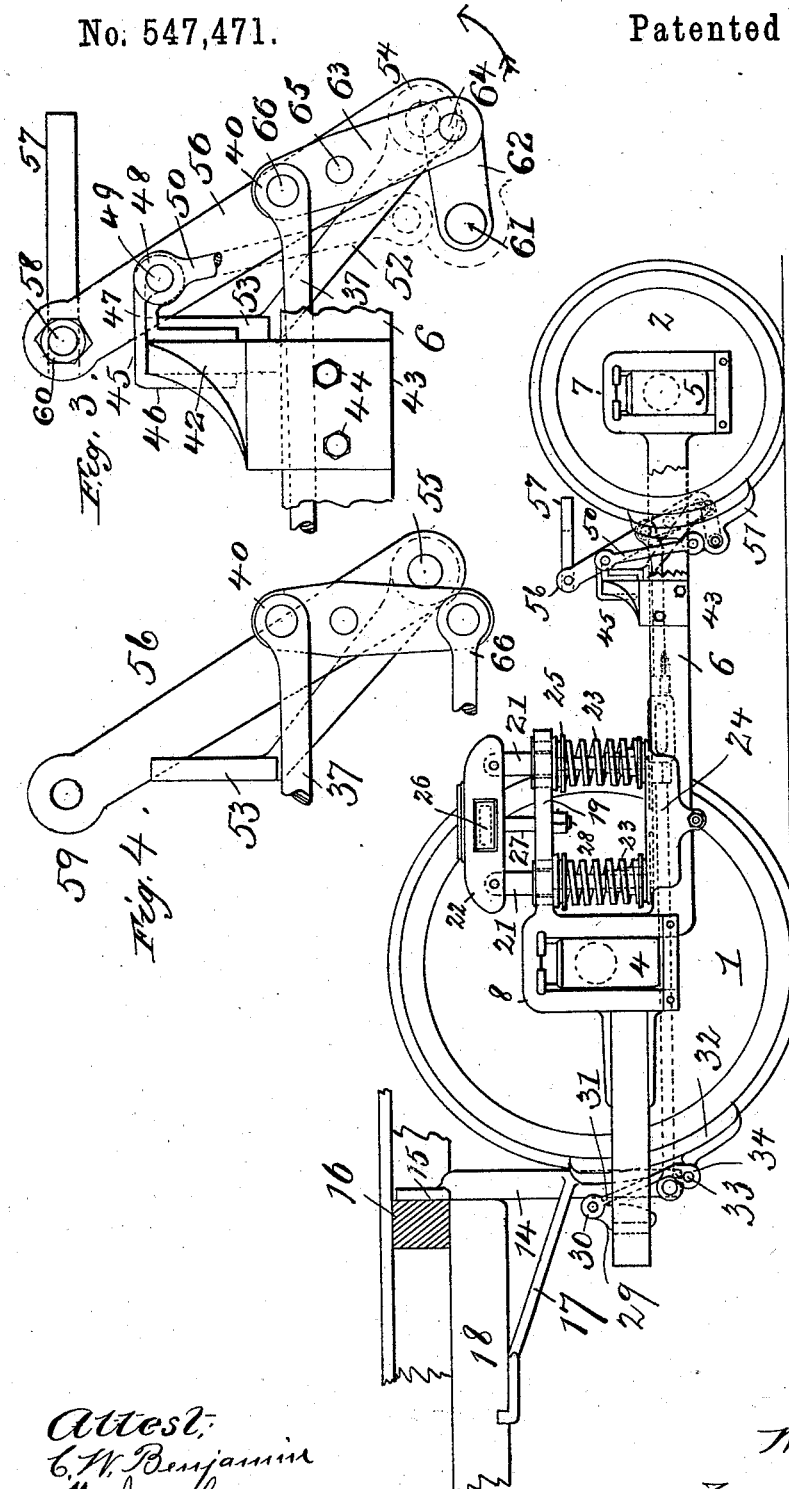

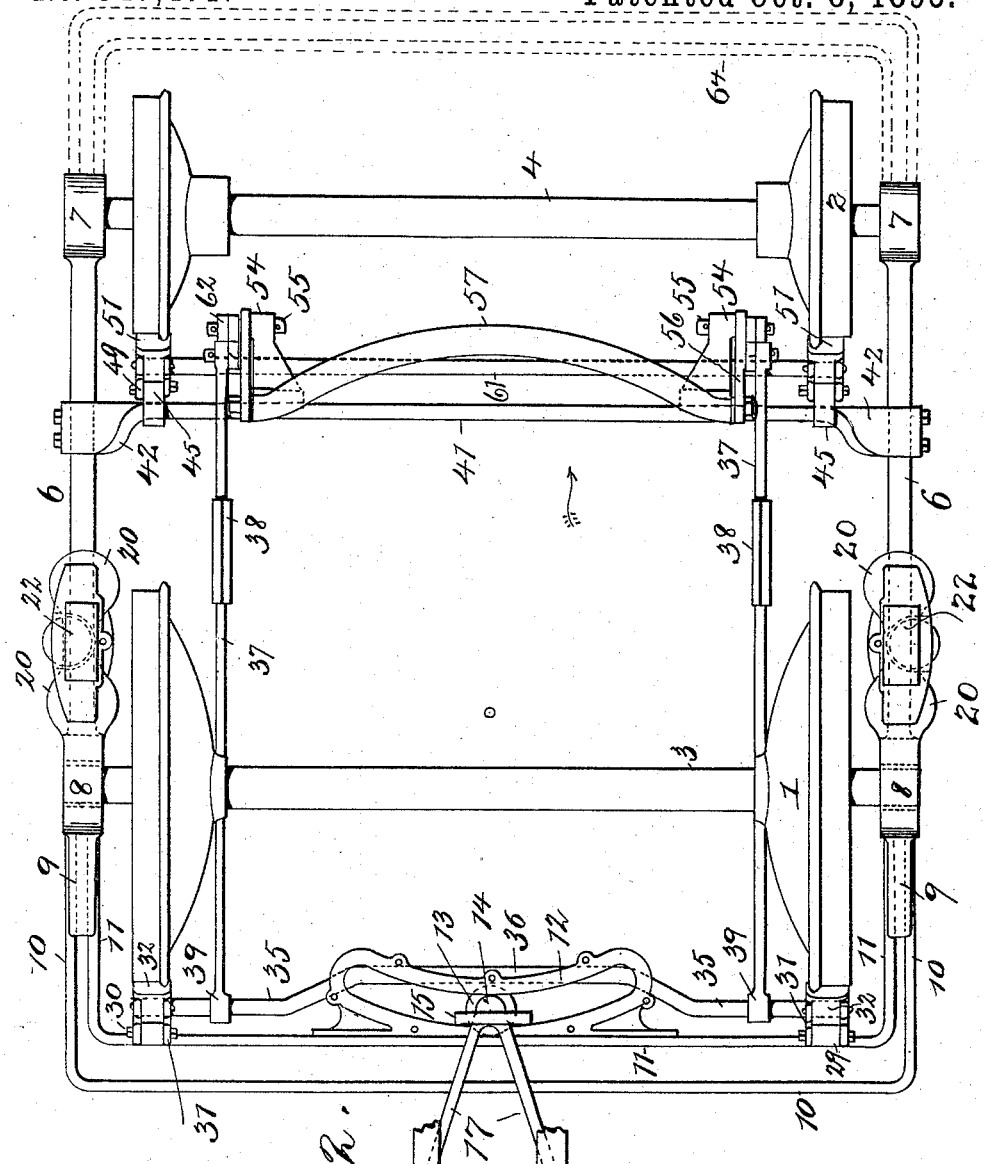

WALTER S. ADAMS, OF PHILADELPHIA, PENNSYLVANIA, ASSIGNOR TO JOHN A. BRILL, OF SAME PLACE.

DIFFERENTIAL BRAKE.

SPECIFICATION forming part of Letters Patent No. 547,471, dated October 8, 1895.

Application filed March 24, 1894. Serial No. 504,926. (No model.)

*To all whom it may concern:*

Be it known that I, WALTER S. ADAMS, a citizen of the United States, residing at Philadelphia, in the county of Philadelphia and State of Pennsylvania, have invented a new and useful Differential Brake, of which the following is a specification.

My invention relates to brake mechanisms for car-trucks generally, and has particular reference to the class of trucks wherein large and small wheels are used. The prime object in this last class of trucks is to get a maximum traction thereof by the disposition of the weight of the car over or nearly over the axle of the large wheels to which the motive power for the truck is applied, the large wheels acting as driving-wheels and the small as the trailing wheels.

It is the object of this invention to provide a brake mechanism wherein greater braking power or force can be exerted upon one of the sets of wheels than on the other, and thus in the class of trucks last described apply a lesser braking force to the trailing wheels, which carry the minimum of the weight of the superposed car-body, and thus reduce the tendency to lift these wheels from the rail and concentrate the greater braking force on the driving-wheels, (which offer a greater braking-surface and through the greater leverage of the large wheels increase the effective braking power,) which support the maximum of the weight of the car, so that the maximum braking force can be exerted to directly arrest the momentum of the driving mechanism, such as an electric motor geared to the driving-wheel axle.

My invention therefore consists in the mechanism and the particular combination of elements thereof herein shown and described, and pointed out in the claims.

In the drawings forming part of this specification, Figure 1 is a side elevation of a car-truck and a portion of a superposed car-body, partly in section, having my improved brake mechanism applied thereto; Fig. 2, a plan view of Fig. 1, a portion of that part of the car-body shown in Fig. 1 being removed; Fig. 3, an enlarged side elevation of the differential mechanism and parts for supporting it on the truck-frame; and Fig. 4 a like view of the upright and differential levers, the hanger, and a modified form of connection with the brake-beams.

Like numerals of reference refer to like parts throughout the several views.

The truck (which embodies the principles of construction of that shown and described in a joint application made by John A. Brill and myself on the 17th day of February, 1893, Serial No. 462,730, and to which cross reference is here made) comprises the following: At 1 2 are the truck-wheels, 1 being the driving and 2 the trailing; 3 4, the axles, and 4 5 the axle-boxes for the respective wheels and axles. The axles are maintained in parallelism by the axle-box frame, which comprises the side bar 6, having the inverted U-shaped yokes 7 for the trailing-wheel axle-boxes, and 8 for the driving-wheel axle-boxes, the side bars lying below the yokes 8 and centrally of the yokes 7, and from a forward recessed extension 9 of the yokes 8 extend forwardly and transversely the bent cross-bars 10 11, uniting the side bars into a component frame. Secured to the inner cross-bar 11 is a segmentally-slotted draw-head 12, in which is adapted to play a roller 13, through which passes an upright draw-bar 14, secured at the top by its securing-plate 15 to a cross-sill 16 of the car and braced by the forwardly-extending bars 17, which are secured to the usual outlooks 18 of the car-platform. This forms the drawing-connection between the car and truck, as set forth in said application.

The pivotal connection between the car and truck and its spring-support on the truck is effected as follows: The yokes 8 have rearwardly-extending bars or pedestals 19, which have enlargements 20, through which pass spring-posts 21, joined together at the top, above the bars 19, by a bearing 22, which is supported on the springs 23, which find a support in the spring cups or cradles 24, which are in turn supported on the side bars 6, the upper ends of the springs engaging plates 25, which bear against shoulders on the spring-posts. The bearing 22 carries a roller 26, mounted on a spindle 27, which may extend through the bar 19 and by a nut 28 on its end limit the upward movement of the bearing. According to said application, the car-body is provided with bearings or rub-plates, which rest on the bearings and which have segmental pendent webs for engagement with the rollers 26, thus completing the pivotal connection of the car and truck. I lay no claim to these features in this application.

My brake mechanism is constructed as follows: Adjacent the large wheels 1 and to the inner cross-bar 11 are secured upright castings 29, through the upper part of which passes a pin 30, (or which may be in the form of a trunnion cast thereon,) from which depend links 31, which engage and support brake-shoes 32 at 33 in the usual way. The rear of the shoes is provided with eyes 34, through which the ends of a transverse brake-beam 35 pass, the beam being bent inwardly, as at 36, in this case to clear the draw-bar 14 and leave it free to play transversely. Extending rearwardly between the wheels and below their axle are brake-rods 37, which are preferably provided with turnbuckles 38 for adjusting the length of the rods, the ends of the rods being provided with eyes 39 40 for engagement with their respective parts, the beam 35 passing through the eyes 39. Supported on the side bars 6, adjacent the trailing wheels 2 and extending across the truck, is a cross-bar 41, the web of which is vertically disposed, its ends being twisted, as at 42, to enable it to lie flat on the side bars 6, the extreme ends of which are bent downward at right angles, as at 43, to engage the sides of the side bars and which prevent transverse movement of the cross-bar, the nuts 44 securing the bar in position. From the top of the cross-bar 41, adjacent the tread of the wheel 2, extend rearwardly the brake-hangers 45, which may either be the casting 29 or constructed, as shown, of strap metal bent into the desired form, with legs 46 for engaging the cross-bar, the longitudinal portion 47 being provided with an eye 48, through which passes a pin 49, having the pendent links 50, secured to brake-shoes 51 in the same way as before stated.

In Fig. 3 the brake-shoe and portion of the link are dotted, so as not to obscure the rest of the view.

At 52 are the lever-hangers, having a vertical plate 53 for securing them in position on the cross-bar 41, the hanger extending downwardly and rearwardly and is provided with an eye 54, through which extends a pin 55. Upon this pin is fulcrumed (all the beforementioned parts are in pairs) the upright brake-lever 56, which has in this case a slight inclination forwardly, which levers are joined transversely by the segmental equalizing-bar 57, having trunnions 58 on the ends, which pass and work in eyes 59, formed at the top of the lever 56, the nuts 60 securing the bar 57 and levers 56 together. If the bar 57 is to form part of a brake mechanism for a non-pivotal truck, it may be straight instead of segmentally disposed. To this bar is movably secured a rod or chain leading from the usual brake-levers secured to the car-body or to the operating means directly, so that a pull on the bar 57 in the direction of the arrow, Fig. 2, will draw the brake-beams together and cause the shoes to bear on the wheels, the bar being disposed in the arc of a circle struck from the pivotal center of the truck, so that it can move about its otherwise stationary connections without breaking said connections and equalize the pull on the brake-levers.

The shoes 51 are connected by the brake-beam 61, and from the beam extends rearwardly in pairs the short links 62, Fig. 3, which in turn are pivotally connected to the lower arm of the levers 63 (which I shall hereinafter call the "differential" levers to properly distinguish them) by a pin 64, which are in their turn fulcrumed on the upright levers 56 at 65, the eyes 40 of the brake-rods 37 engaging a pin 66 at the top of their upper arms.

The mechanism shown in Figs. 1, 2, and 3 is specially adapted for location between the axles of the truck, the space between the wheels 2 being free for curving; but should this arrangement be undesirable for particular instances that shown in Fig. 4 can be advantageously used, in which case either the support 29 or the hanger 52 can be secured in proper alignment to an additional cross bar or bars 64 (similar to 10 and 11 and secured in the same way or otherwise) and a brake-rod 66 used to connect the levers 63 with the brake-beam 61. If it be desired to dispense with the differential feature of this mechanism, the lever 63 could be fulcrumed centrally upon the upright lever 56 and act as an equalizer or floating lever.

The operation is as follows: Power being applied to the bar 57 in the direction of the arrow, Fig. 2, the levers 56 will be vibrated in that direction on their fulcra 55, carrying the levers 63, to the upper arms of which the brake-rods 37 are secured, moving the rods in the same direction and vibrating the links and shoes 31 32 until the shoes find a firm resistance against the tread of the wheel. The pins 66 then become the fulcra of the levers 63, with the power applied at 65, the effort of the levers 56 moving the lower arms of the levers 63 in the direction of the arrow, Fig. 3, drawing the links 62, beam 61, and shoe 51 in that direction and applying the shoes to the tread of the wheels 2. During the first portion of the vibration of the lever 56 the leverage has been that of the second order, with the weight close to the fulcrum, the weight being at 65, the power at 58, and fulcrum at 55, so that great leverage has been exerted to apply the shoes to the large wheels, while the second portion of the movement of the levers 56 has formed the levers 63 into that of the third order with the fulcrum at 66, the power at 65, and the weight at 64, the weight being farther removed from the power than the fulcrum, which reduces the power applied to the wheels 2 to a great extent when compared to that applied to the wheels 1 by a lever of a more powerful order. Thus the maximum braking power is applied in this case directly to the large wheels, where it is most effective, and the minimum to the small wheels, where it is least required. By changing the fulcrum of the levers 63 on the levers 56—that is, between the extremes of the levers 63—different leverages may be obtained to proportion the amount of braking pressure applied to the large wheels, so that should their diameter be changed a proportionate differentiation of pressure of the brakes upon the large and small wheels can be had.

From the foregoing it will be observed that many changes and modifications can be made in the construction and mode of application of my invention, the main essential being the differential operation, without departing from the spirit thereof.

Having described my invention, I claim—

1. In a differential brake mechanism, the combination, with a truck, its wheels, brake shoes, beams, and rods, of a primary lever connected with the source of power, a supplemental lever fulcrumed on the primary lever and having long and short arms, the said rods connecting the beams at each set of wheels with the long and short arms respectively of the supplemental lever, whereby means are provided for transforming the braking pressure applied to the primary lever into differentiated pressure on each separate set of wheels of the truck, substantially as described.

2. In a differential brake mechanism, the combination, with a truck, its wheels, brake shoes, beams, and rods, of a primary lever having a permanently fixed fulcrum, a supplemental lever fulcrumed on the primary lever nearer the latter's fulcrum than its power end, said supplemental lever having long and short arms, the short arm being connected to one of the rods and the long arm to another of the rods, whereby the original braking pressure is transformed into differentiated pressure, substantially as described.

3. The combination, in a brake mechanism, of the shoes, their connecting beams, the brake rods, the primary lever, and a supplemental lever fulcrumed on the primary lever intermediate of its extremes and having a resistance arm longer than the power arm, one of the rods being connected to the shorter arm of said lever and another of the rods being connected to the longer arm, substantially as described.

4. The combination, with a truck having large and small wheels, of a brake mechanism comprising shoes, beams, and rods, a primary lever, and a supplemental lever having unequal arms fulcrumed to the primary lever, the said rods connecting the unequal arms of the supplemental lever with the shoes of the large and small wheels respectively, whereby means are provided for applying a greater braking pressure to the large wheels than to the small wheels, substantially as described.

5. The combination, with a truck having large and small wheels, of a brake mechanism comprising a primary lever, and means for operating the same, brake shoes, beams connecting the shoes, a supplemental lever having a long and short arm fulcrumed on the primary lever intermediate of the latter's extremes, the shoes adjacent the large wheels being connected to the shorter arm and the shoes adjacent the small wheels being connected to the longer arm of said lever, substantially as described.

6. The combination, in a brake mechanism, of the shoes, their connecting beams, the brake rods, the primary lever, and a supplemental lever fulcrumed on the primary lever intermediate of its extremes, one of the beams being connected to one end, the other to the other end of said supplemental lever, substantially as described.

7. The combination, in a brake mechanism, of the shoes, their connecting beams, the brake rods, the primary lever having a fixed and permanent fulcrum, with a supplemental lever fulcrumed on the primary lever intermediate of its extremes, the beams being connected to the opposite ends of said supplemental lever, the primary lever operating as a lever of the second, and the supplemental lever as a lever of the third order, while braking, substantially as described.

8. The combination, in a brake, with the shoes, beams, of the levers 56 having a permanently fixed fulcrum, the levers 63 fulcrumed on the levers 56, rods 37 connecting the upper arms of the levers 63 with one beam, links or rods 62, 66 connecting the lower arm of said lever with the opposing beam, and the equalizing bar 57 connecting the levers 56, substantially as described.

9. The combination, in a brake, with the shoes, beams, of the levers 56 having a permanently fixed fulcrum, the levers 63 having a long and short arm fulcrumed on the levers 56 intermediate of the latter's extremes, rods 37 connecting the short arms of the levers 63 with one beam, links or rods 62, 66 connecting the longer arm of said lever with the opposing beam, and the equalizing bar 57 connecting the levers 56 with the source of power, substantially as described.

10. In a brake, the combination, with a truck having the cross bar 41, a substantially stationary frame to which the cross bar is secured, of the inflexible hangers 52 pendent from said cross bar, the upwardly inclined levers 56 fulcrumed at their ends to said hangers, the levers 63 fulcrumed on the levers 56 intermediate their extremes, brake shoes and connecting beams, and rods connecting the top and bottom of the levers 63 with the beams, substantially as described.

11. In a brake, the combination, with the cross bar 41, a substantially stationary frame to which said cross bar is secured, of the inflexible lever hangers 52 pendent from the cross bar, the upwardly inclined levers 56 fulcrumed at their ends on said hangers, the levers 63 fulcrumed on the levers 56 intermediate their extremes, the brake hangers 45 secured to the cross bar, links 50 depending from the brake hangers, shoes on the links, other shoes similarly supported, beams connecting the shoes, and rods connecting the ends of the levers 63 with the opposing beams, substantially as described.

Signed at Philadelphia, in the county of Philadelphia and State of Pennsylvania, this 28th day of February, 1894.

WALTER S. ADAMS.

Witnesses:
M. H. McNEIL,
HENRY C. ESLING.